(12) United States Patent
Simon et al.

(10) Patent No.: US 12,078,099 B2
(45) Date of Patent: Sep. 3, 2024

(54) HYDROGEN INTAKE ASSEMBLY FOR A HYDROGEN INTERNAL COMBUSTION ENGINE

(71) Applicant: VOLVO TRUCK CORPORATION, Gothenburg (SE)

(72) Inventors: Lionel Simon, Lyons (FR); Jean-marc Neveu, St Priest (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/357,602

(22) Filed: Jul. 24, 2023

(65) Prior Publication Data

US 2024/0018898 A1    Jan. 18, 2024

Related U.S. Application Data

(63) Continuation of application No. 17/808,669, filed on Jun. 24, 2022, now Pat. No. 11,732,642.

(30) Foreign Application Priority Data

Jul. 6, 2021   (EP) .................................. 21184039

(51) Int. Cl.
*F02B 69/04* (2006.01)
*F02B 23/10* (2006.01)
*F02B 75/12* (2006.01)

(52) U.S. Cl.
CPC ........ *F02B 69/04* (2013.01); *F02B 2023/106* (2013.01); *F02B 2075/125* (2013.01)

(58) Field of Classification Search
CPC ................ F02B 69/04; F02B 2023/106; F02B 2075/125; F02B 27/006; F02B 43/10;
(Continued)

(56) References Cited

U.S. PATENT DOCUMENTS

| 10,767,574 B2 | 9/2020 | Finn et al. |
| 2013/0042836 A1 | 2/2013 | Trembath et al. |

(Continued)

FOREIGN PATENT DOCUMENTS

| AT | 253305 B | 4/1967 |
| EP | 2578848 A1 | 4/2013 |

(Continued)

OTHER PUBLICATIONS

European Search Report and Written Opinion in corresponding European Application No. 21184039.2 dated Nov. 26, 2021 (6 pages).

*Primary Examiner* — Hai H Huynh
(74) *Attorney, Agent, or Firm* — Venable LLP; Jeffri A. Kaminski (57) ABSTRACT

A hydrogen intake assembly for a hydrogen internal combustion engine characterized in that the hydrogen intake assembly includes at least one air intake manifold comprising an air intake pipe comprising at least one air inlet and air outlets, air intake runners comprising air inlets and air outlets, a spacer having a wall defining an inner chamber receiving a mixture of air, water and hydrogen and comprising air inlets and mixture outlets delivering said mixture, a water rail comprising at least one water inlet and water outlets, said water outlets being embedded in the wall of the spacer and a hydrogen rail comprising at least a hydrogen inlet and hydrogen outlets.

11 Claims, 4 Drawing Sheets

(58) Field of Classification Search
CPC ..... Y02T 10/12; Y02T 10/30; F02M 21/0206;
F02M 21/0281; F02M 25/0221; F02M
25/028; F02M 35/10072; F02M
35/10085; F02M 35/10111; F02M
35/10118; F02M 35/10209; F02M
35/10275; F02M 35/10216; F02M 35/104
USPC ............... 123/184.21, 470, 25 C, 25 A, 527,
123/DIG. 12; 29/888.01, 890.08
See application file for complete search history.

(56) References Cited

U.S. PATENT DOCUMENTS

2013/0220270 A1\* 8/2013 Imai .................... F02M 21/0281
123/294
2016/0032876 A1 2/2016 Hollinger

FOREIGN PATENT DOCUMENTS

| FR | 2425545 A1 | 12/1979 |
| JP | 2016118109 A | 6/2016 |
| KR | 20190108368 A | 9/2019 |

\* cited by examiner

HYDROGEN INTAKE ASSEMBLY FOR A HYDROGEN INTERNAL COMBUSTION ENGINE

CROSS-REFERENCE TO RELATED APPLICATIONS

This application is a continuation of U.S. patent application Ser. No. 17/808,669, filed on Jun. 24, 2022, which claims the benefit of European Patent Application No. 21184039.2, filed Jul. 6, 2021, all of which are incorporated by reference.

TECHNICAL FIELD

The invention relates to a hydrogen intake assembly for a hydrogen internal combustion engine, a hydrogen internal combustion engine comprising said hydrogen intake assembly, a vehicle comprising said hydrogen intake assembly and a method for the manufacture of a hydrogen internal combustion engine.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as passenger vehicles.

BACKGROUND

Internal combustion engines operate by way of burning a fuel such as diesel or gasoline, in the presence of an oxidant inside a combustion chamber. Therefore, the fuel is transformed into other chemical species or combustion products, such as carbon dioxide ($CO_2$), water ($H_2O$) and byproducts such as nitrogen oxides (NOx). Moreover, mechanical and thermal energy are produced. The chemical species or combustion products emitted are released as exhausts gases. In order to reduce NOx emissions, aftertreatment of the exhausts gases are necessary.

An internal combustion engine generally works in cycles comprising:
an intake phase where the fuel is introduced in a combustion chamber,
a compression phase where the fuel is compressed by a piston slidably moving between a top dead center position and a bottom dead center position, and
a combustion phase where the fuel is ignited.
An exhaust phase where burned gases are evacuated.

The vehicle industry is striving to reduce $CO_2$ and byproducts emissions. For this purpose, various alternatives to diesel and gasoline have been developed for energizing vehicles. One such alternative is the use of hydrogen as fuel. The chemical energy of the hydrogen reacting with air may be converted into mechanical energy in order to propel the vehicle.

More precisely, hydrogen and air are directly injected separately, through intake ports, into the combustion chamber of the internal combustion engine. The chemical reaction mostly produce $H_2O$ at high-temperature and high-pressure. Exhaust gases are released through an exhaust port.

JP2016118109 discloses a hydrogen engine comprising first water injection means which injects water into a corresponding intake port of a cylinder which is formed at each cylinder of a hydrogen engine; an intake passage connected to the intake port of the hydrogen engine via an intake manifold; second water injection means arranged at the intake passage; and control means which decides a volume of water injected by the water injection means on the basis of a generation status of a back fire in the hydrogen engine, and makes the water injection means inject the decided volume of water.

However, the use of hydrogen as a fuel inside a combustion engine present several issues. Hydrogen burns very easily, very fast and at high temperature. Therefore, ignition energy is very low and can induce abnormal combustion, like autoignition and knock, but also backfire from the combustion chamber to the intake ports.

To mitigate these main issues, it is known to operated under extremely lean conditions at air ratios far higher than $\Delta=2$ over a wide power range, so the level of NOx emissions is negligible. Even the crude exhaust has significantly lower concentrations of NOx in such a hydrogen-based operation in comparison with emissions of a hydrocarbon-based process following aftertreatment of the exhaust gases. Only if a relatively high power output is required it is necessary to make the fuel-air mixture richer in the range of $1 \leq \lambda \leq 2$, which then is associated with a drastic increase in NOx emissions and thus the need for aftertreatment of the exhaust gas. However, this solution is costly.

Another solution is to dilute hydrogen with exhaust gas using a so called exhaust gas recirculation (EGR) unit. But it is not easy to have a sufficient amount of EGR because of the risk of water condensation when cooling and the low enthalpy of the exhaust gases to drive the internal combustion engine. In addition, EGR requires an exhaust gas pumping system which reduces the overall efficiency of the internal combustion engine.

Another solution is to dilute hydrogen with water in liquid phase, in order to lower the temperature of the combustion products as well as the temperature of overheated parts. This solution avoids implementing an exhaust gas pumping system in the internal combustion engine. The water is instantly vaporized to steam by igniting hydrogen gas. In addition, this solution allows decreasing boost efforts by working on lower dilution than with EGR.

Conventional internal combustion engines using hydrogen as fuel do not manage to eliminate the above drawbacks.

SUMMARY

An object of the invention is to provide a hydrogen internal combustion engine, in particular a hydrogen intake assembly that solves the above drawbacks notably by reducing abnormal combustion, like autoignition and knock, but also backfire, and by reducing residual hydrogen. Furthermore, an object of the invention is to provide an easy-to-produce and a low cost hydrogen internal combustion engine, in particular a hydrogen intake assembly.

The object is achieved by a hydrogen intake assembly for a hydrogen internal combustion engine characterized in that the hydrogen intake assembly comprises:
At least one air intake manifold comprising:
an air intake pipe comprising at least one air inlet and air outlets,
air intake runners comprising air inlets and air outlets, said air inlets of the air intake runners being connected to the air outlets of the air intake pipe,
A spacer having a wall defining an inner chamber receiving a mixture of air, water and hydrogen and comprising air inlets and mixture outlets delivering said mixture, said air inlets of the spacer being connected to the air outlets of the air intake runners, said mixture outlets of the spacer being configured to be secured on a cylinder head of a hydrogen internal combustion engine, A water rail comprising at least one water inlet and water outlets, said water outlets being embedded in the wall of the spacer and A hydrogen rail comprising at least one hydrogen inlet and hydrogen outlets, said hydrogen outlets being connected to hydrogen intake pipes including hydrogen inlets and hydrogen outlets, said hydrogen outlets of the hydrogen intake pipes being embedded in the wall of the spacer.

By the provision of a hydrogen intake assembly according to the present invention, the invention offers a compact hydrogen intake assembly leading to a compact hydrogen internal combustion engine. Furthermore, each runner collaborates selectively with one cylinder included in the cylinder block of the hydrogen internal combustion engine optimizing its filling. Moreover, the configuration of the hydrogen intake assembly optimizes gas velocities of air and hydrogen. Thus, there is no residual hydrogen rising up the air intake runners and therefore air intake manifold. The architecture of the hydrogen intake assembly avoids abnormal combustion such as autoignition and knock, or backfire. Additionally, the hydrogen intake assembly allows a high quality indirect injection. Indeed, the spacer enhances the mixture of hydrogen, water and air which will be injected, through intake valves into the combustion chamber of the hydrogen internal combustion engine. The spacer guides the mixture of hydrogen, water and air towards the cylinder head.

According to one embodiment, the pressure of water in the water rail is between $1 \cdot 10^5$ and 5 Pa, preferably between $5 \cdot 10^5$ and $15 \cdot 10^5$ Pa and for example around $10 \cdot 10^5$ Pa.

According to one embodiment, the pressure of hydrogen in the hydrogen rail is between 5 and $45 \cdot 10^5$ Pa, preferably between $20 \cdot 10^5$ and $40 \cdot 10^5$ Pa and for example around 5 Pa.

According to one embodiment, each air intake runner includes at least one loop surrounding the air intake pipe. In this embodiment, the loop of the air intake runner permits to extend the air intake runner to optimize the air velocity while preventing the rise of hydrogen along the air intake runner. Additionally, the air intake runner including a loop allows for a more compact hydrogen intake assembly and an optimized filling of it.

According to one embodiment, each air intake runner includes at least two loops surrounding the air intake pipe. In this embodiment, it is believed that the air velocity is further improved, that the rise of hydrogen and water along the air intake runner is inhibited and that the filling of the air intake runners is further optimized.

According to one embodiment, each intake runner has a length between 500 and 2000 mm, preferably between 500 and 1500 mm and advantageously between 600 and 1200 mm. Section is chosen to optimize air velocity. In this embodiment, the air intake runner offers a good comprise between the air velocity properties, the prevention of the residual hydrogen while keeping a compact hydrogen intake assembly able to be implemented in any engine.

According to one embodiment, the air inlets of the air intake runners, the air outlets of the air intake runners and/or the outlets of the air intake pipe have an oval shape or a convergent shape. In this embodiment, it is believed that the air velocity is optimized.

According to one embodiment, the hydrogen outlets of the hydrogen intake pipes comprise each a hydrogen injector embedded in the wall of the spacer. In this embodiment, the position of the hydrogen injection has been studied to enhance the mixture of hydrogen, air and water.

According to one embodiment, a longitudinal axis of the inner chamber of the spacer and a longitudinal axis of the hydrogen injector forms an angle between 10 and 40°. In this embodiment, it is believed that hydrogen flows in a direction directed to at least one of the valve axes or intake axes to avoid hydrogen gases residual in intake.

According to one embodiment, the water outlets comprise each a water injector embedded in the wall of the spacer. In this embodiment, the position of the water injection has been studied to enhance the mixture of hydrogen, air and water.

According to one embodiment, the hydrogen injectors and the water injectors are located on a common transversal section of the wall of the spacer. In other words, the spacer defines the inner chamber comprises a plurality of transversal sections, one of the plurality of transversal sections comprises one hydrogen injector and one water injector. Thus, the hydrogen and the water are injected at the same place in the inner chamber of the spacer leading to an enhanced mixture.

According to one embodiment, the hydrogen intake assembly comprises two air intake manifolds comprises each one air inlet. In this embodiment, it is believed that the hydrogen intake assembly can be adjustable such that a better repartition of the air is performed and therefore a better repartition of the mixture towards each cylinder.

According to a second aspect of the present invention, the object is achieved by a hydrogen internal combustion engine, comprising:
 a hydrogen internal combustion engine comprising:
  a cylinder head comprising mixture intake valves, exhaust valves and spark plugs,
  a cylinder block housing a plurality of cylinders; each cylinder comprising a piston,
  said cylinder head being configured to be secured on the top of the cylinder block so as to form a combustion chamber receiving a mixture of hydrogen, air and water and
 a hydrogen intake assembly according to the present invention including a spacer having mixture outlets being secured on said cylinder head.

The hydrogen internal combustion engine according to the present invention is compact, prevents an abnormal combustion such as autoignition and knock, or backfire, and prevents the rise of hydrogen through the runners leading to a high quality indirect injection.

According to one embodiment, each hydrogen injector is located in front of an intake valve included in the cylinder head of the hydrogen internal combustion engine. In this embodiment, it is believed that the capacity of the hydrogen intake assembly is improved.

According to a third aspect of the present invention, the object is achieved by a method for the manufacture of a hydrogen internal combustion engine according to the present invention comprising the following step:

A. The provision of a diesel internal combustion engine including a diesel intake assembly and a diesel internal combustion engine, said diesel internal combustion engine comprising:
 a cylinder head comprising mixture intake valves, exhaust valves and diesel injectors,
 a cylinder block housing a plurality of cylinders; each cylinder comprising a piston, said cylinder head being configured to be secured on the top of the cylinder block so as to form a combustion chamber receiving a mixture of air and diesel,
said diesel intake assembly including air outlets being secured on said cylinder head,
B. The replacement of diesel injectors by spark plugs in the cylinder head,
C. The removal of the diesel intake assembly and
D. The setting of the hydrogen intake assembly according to the present invention on the cylinder head.

The method of the present invention permits to recycle in an easy way diesel internal combustion engine to manufacture a hydrogen internal combustion engine. Thus, there is no need to manufacture the whole hydrogen internal combustion engine leading to a cost saving method. Additionally, the implementation of hydrogen intake assembly do not modify the volume of the engine. Therefore, the hydrogen intake assembly can easily be implemented in any diesel internal combustion engine for any kind of vehicle. Moreover, the method for the manufacture of a hydrogen internal combustion engine is comfortably realizable.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EMBODIMENTS OF THE INVENTION

Figure 1:
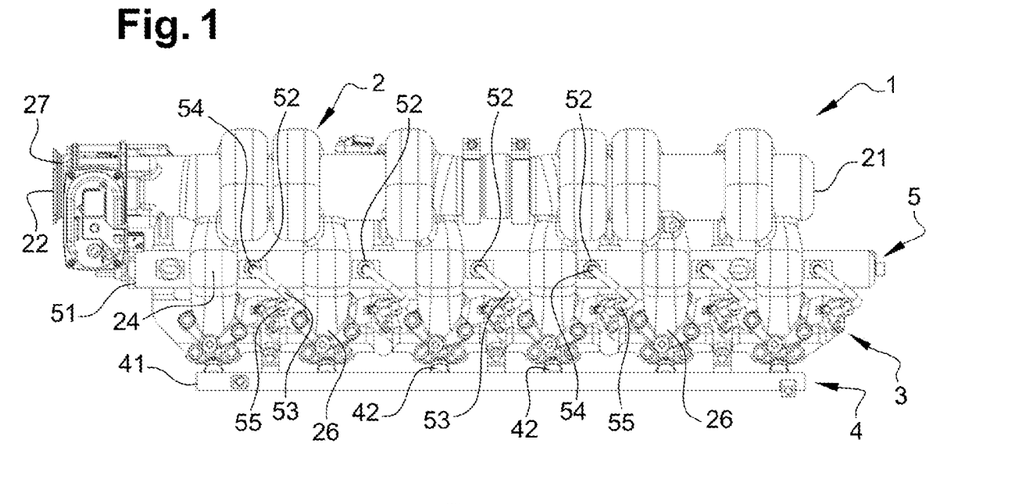
FIG. 1 is a hydrogen intake assembly according to one embodiment of the present invention.
Figure 2:
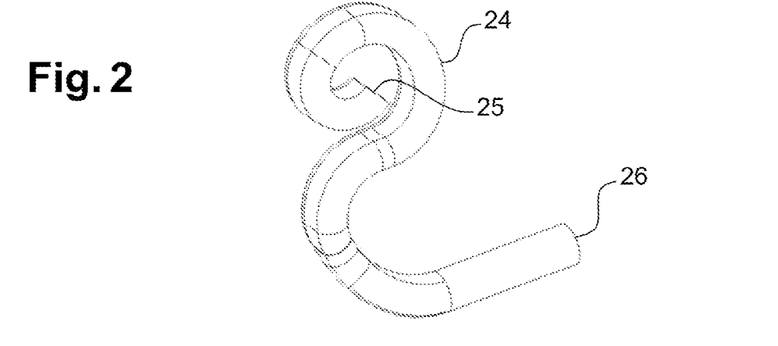
FIG. 2 is an air intake runner according to one embodiment of the present invention.

FIG. 1 illustrates a hydrogen intake assembly 1 for a hydrogen internal combustion engine (not illustrated) for a vehicle.

Figure 3:
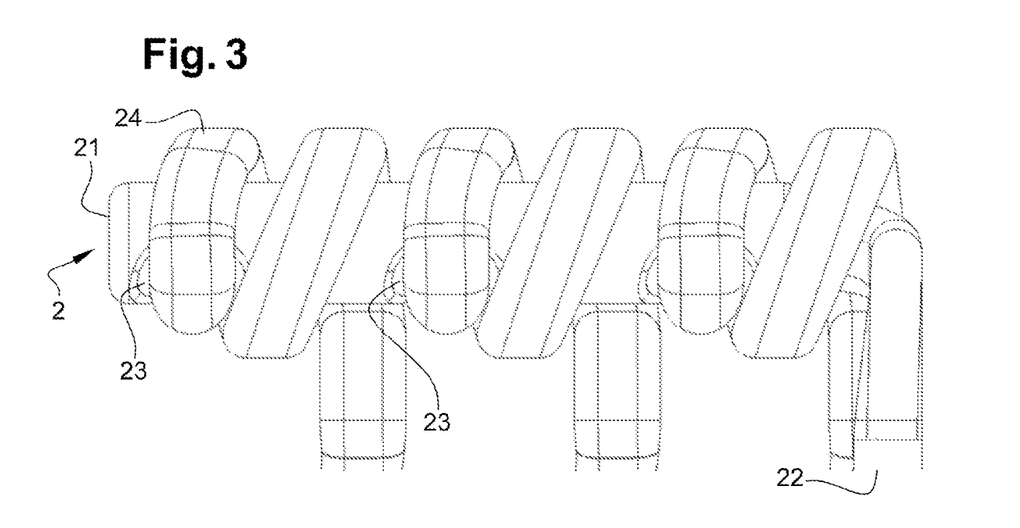
FIG. 3 is an air intake manifold according to one embodiment of the present invention.
Figure 4:
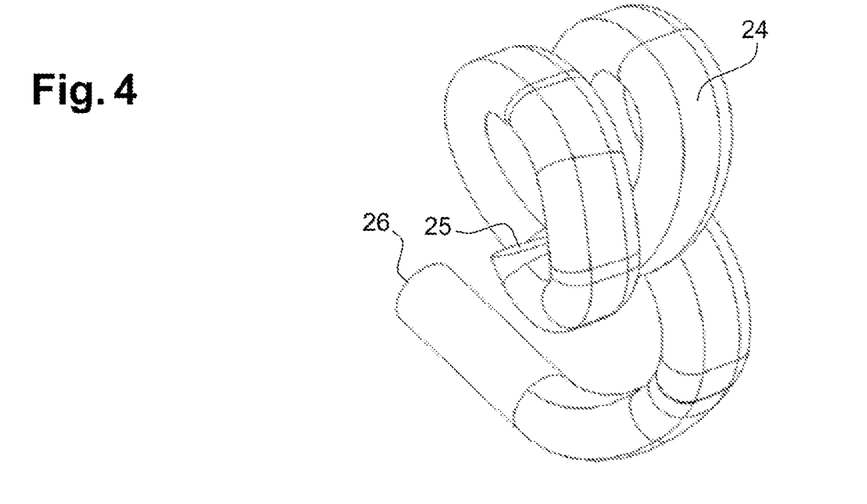
FIG. 4 is an air intake runner according to another embodiment of the present invention.

The hydrogen intake assembly 1 may comprise one air intake manifold 2 comprising an air intake pipe 21 comprising for example one air inlet 22 and air outlets 23 as it can be seen on FIG. 3.

The hydrogen intake assembly 1 comprises air intake runners 24 comprising air inlets 25 and air outlets 26. The air inlets 25 of the air intake runners 24 are connected to the air outlets 23 of the air intake pipe 21 (FIGS. 2-7). An ITV electrical valve 27 may regulate the proportion of air.

Figure 7:
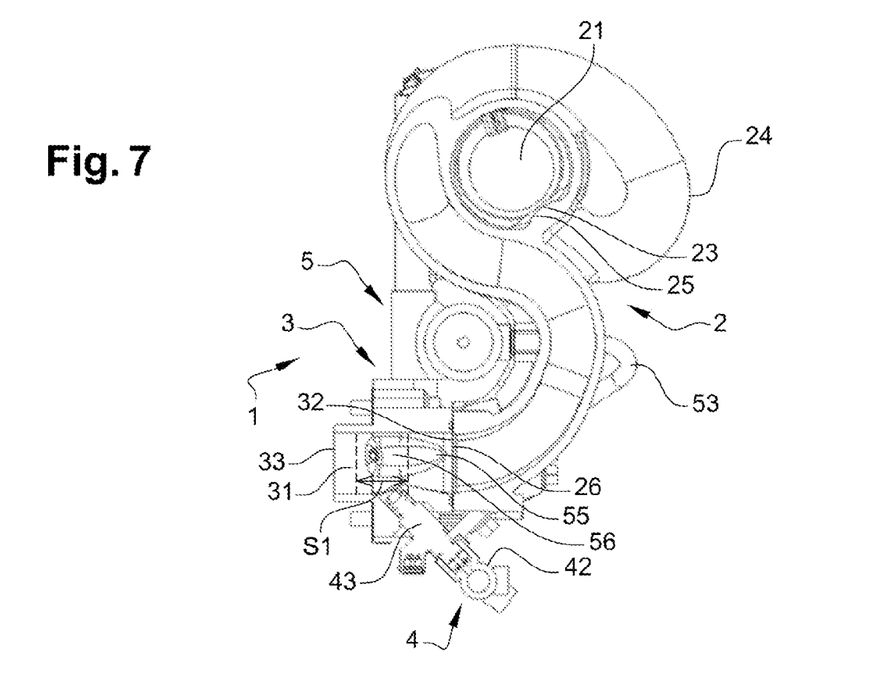
FIG. 7 is another sectional crossed view of a hydrogen intake assembly according to one embodiment of the present invention.

As shown in FIG. 7, the hydrogen intake assembly 1 further comprises a spacer 3 having a wall 31 defining an inner chamber receiving a mixture of air, water and hydrogen and comprising air inlets 32 and mixture outlets 33 delivering said mixture. The air inlets 32 are connected to the air outlets 26 of the air intake runners 24, said mixture outlets 33 of the spacer 3 being configured to be secured on a cylinder head 6 of a hydrogen internal combustion engine (not illustrated).

The hydrogen intake assembly 1 further comprises a water rail 4 comprising, for example, one water inlet 41 and water outlets 42, said water outlets 42 being embedded in the wall 31 of the spacer 3. Water is preferably is liquid phase. For example, the pressure of water in the water rail 4 is around $10 \cdot 10^5$ Pa.

The hydrogen intake assembly 1 further comprises a hydrogen rail 5 comprising one hydrogen inlet 51 and hydrogen outlets 52. The hydrogen outlets 52 are connected to hydrogen intake pipes 53 including hydrogen inlets 54 and hydrogen outlets 55, said hydrogen outlets 55 of the hydrogen intake pipes 53 being embedded in the wall 31 of the spacer 3. Hydrogen is preferably is gas phase. For example, the pressure of hydrogen in the hydrogen rail 5 is around $30 \cdot 10^5$ Pa.

FIGS. 1, 2, 6, 7 and 9 illustrate an example wherein each air intake runner 24 includes one loop surrounding the air intake pipe 21. In another embodiment illustrated FIGS. 3 and 4, each air intake runner 24 includes two loops surrounding the air intake pipe 21. Preferably, each intake runner has a length between 600 and 1200 mm.

Figure 5:
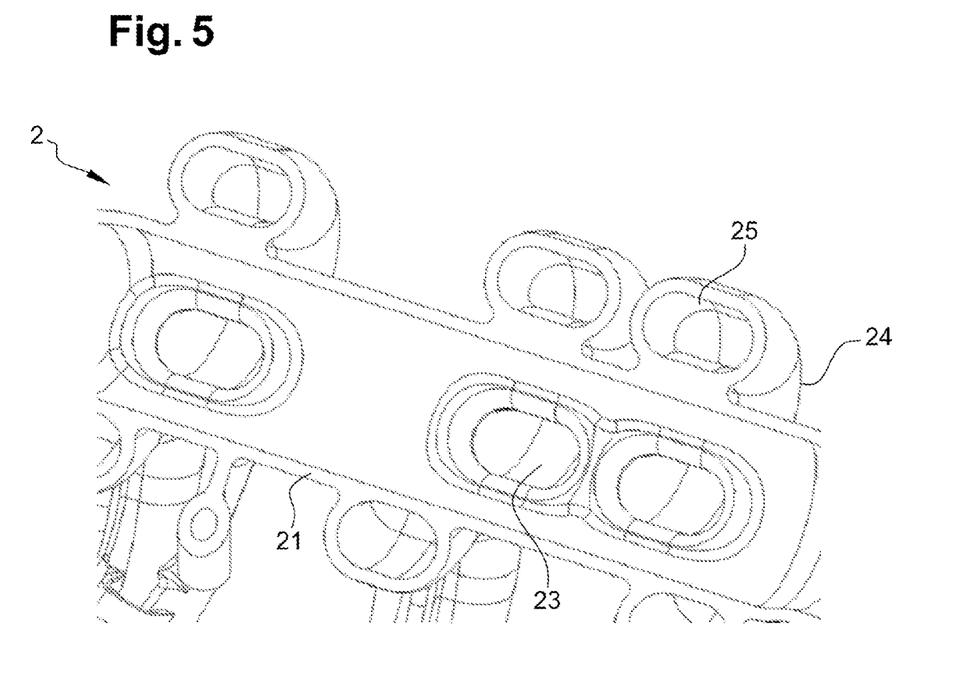
FIG. 5 is a partial view of an air intake manifold according to one embodiment of the present invention.

FIG. 5 illustrates an example wherein the air inlets 25 of the air intake runners 24 and the air outlets 26 of the air intake runners 24 have an oval shape. FIG. 5 also illustrates an example wherein the outlets 23 of the air intake pipe 21 have a convergent shape.

Figure 6:
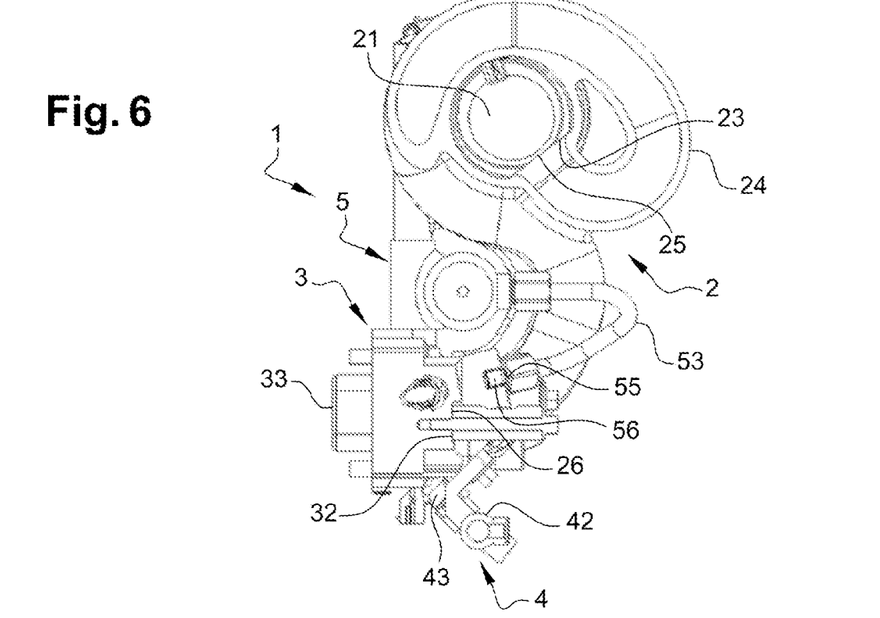
FIG. 6 is a sectional crossed view of a hydrogen intake assembly according to one embodiment of the present invention.
Figure 8:
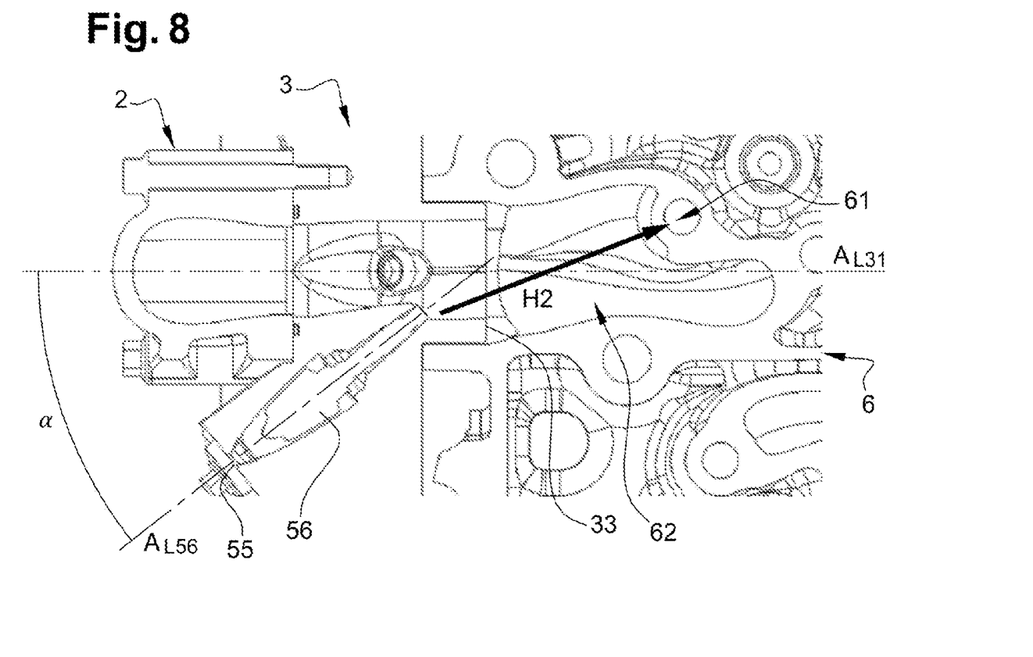
FIG. 8 is another sectional crossed view of a hydrogen intake assembly according to one embodiment of the present invention and FIG. 9 is an air intake manifold according to one embodiment of the present invention.

As illustrated in FIGS. 6 to 8, the hydrogen outlets 55 of the hydrogen intake pipes 53 may comprise each a hydrogen injector 56 embedded in the wall 31 of the spacer 3. Preferably, a longitudinal axis $A_{L31}$ of the inner chamber 31 of the spacer 3 and a longitudinal axis $A_{L56}$ of the hydrogen injector 56 forms an angle between 10 and 40° (FIG. 8).

The water outlets 42 may each comprise a water injector 43 embedded in the wall 31 of the spacer 3.

As illustrated, the hydrogen injectors 56 and the water injectors 43 can be located on a common transversal section S1 of the wall 31 of the spacer 3. For example, one transversal section represents less than 33%, and preferably less than 25%, of the whole transversal wall of the spacer 3 (FIGS. 6 and 7).

Figure 9:
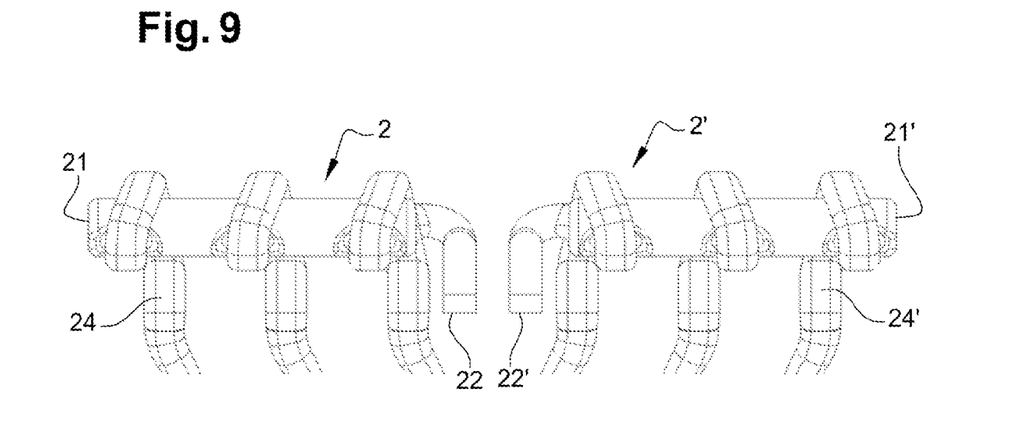

FIG. 9 illustrates a further embodiment wherein the hydrogen intake assembly 1 comprises two air intake manifolds 2, 2' comprises each one air inlet 22, 22'. This embodiment allows better air flow efficiency.

According to the present invention, a hydrogen internal combustion engine comprises:
a hydrogen internal combustion engine (not illustrated) comprising:
a cylinder head 6 comprising mixture intake valves 61, exhaust valves (not shown) and spark plugs (not shown),
a cylinder block (not shown) housing a plurality of cylinders (not shown); each cylinder comprising a piston (not shown),
said cylinder head 6 being configured to be secured on the top of the cylinder block so as to form a combustion chamber (not shown) receiving a mixture of hydrogen, air and water and the hydrogen intake assembly according to the present invention including the spacer 3 having mixture outlets 33 being secured on said cylinder head 6.

The cylinder head 6 may further comprise an intake port 62 wherein the mixture may flow to reach the intake valve 61 and the combustion chamber (FIG. 8).

Each hydrogen injector 43 may be located in front of an intake valve 61 included in the cylinder head 6 of the hydrogen internal combustion engine.

In operating mode, the hydrogen internal combustion engine works by following the below cycle comprising:

an intake phase where the mixture is introduced in the combustion chamber, a compression phase where hydrogen of the mixture is compressed by the piston, and a combustion phase where hydrogen of the mixture is ignited by a spark plug disposed in the combustion chamber.

Thus, the mixture of hydrogen, air and water is indirectly injected in the combustion chamber, through the intake port 62 and the intake valve 61 of the cylinder head 6 (FIG. 8). Hydrogen and air react to form water. Additionally, the water injected in liquid phase controls the hydrogen combustion by lowering the temperature of the combustion gases thus avoiding back flow of combustion gases from the combustion chamber to the intake port.

The hydrogen intake assembly according to the present invention is compact and optimizes the filling of the air intake runners. Furthermore, the architecture of the hydrogen intake assembly enhances the gases velocities of air and hydrogen and inhibits residual hydrogen rising up the runners and the air intake manifold. The hydrogen intake assembly avoids abnormal combustion. Additionally, the hydrogen intake assembly allows a high quality indirect injection.

The invention is also of interest for user having a vehicle or a fleet of vehicles equipped with diesel internal combustion engine as the invention makes it possible to convert said diesel internal combustion engine into a hydrogen internal combustion engine according to the present invention.

A diesel internal combustion engine commonly includes a diesel intake assembly connected to a cylinder head. The cylinder head is provided with intake valves 61, exhaust valves and diesel injectors a cylinder block housing a plurality of cylinders; each cylinder comprising a piston. The cylinder head 6 is configured to be secured on the top of the cylinder block so as to form a combustion chamber receiving a mixture of air and diesel. The diesel intake assembly includes air outlets being secured on said cylinder head.

The invention makes provision for removing the diesel intake assembly and fit the hydrogen intake assembly 1 according to the present invention on the cylinder head 6. To complete the conversion from diesel to hydrogen, spark plugs are placed in the cylinder head.

The method for the manufacture of a hydrogen internal combustion engine according to the present invention permits to recycle diesel internal combustion engine leading to a cost saving method and low environment impact. Additionally, the implementation of said compact hydrogen intake assembly can be carried out on any diesel internal combustion engine for any kind of vehicle.

It is to be understood that the present invention is not limited to the embodiments described above and illustrated in the drawings; rather, the skilled person will recognize that many changes and modifications may be made within the scope of the appended claims.

The invention claimed is:

1. A method for manufacturing of a hydrogen internal combustion engine, comprising:
    A. providing a diesel internal combustion engine including a diesel intake assembly and a diesel internal combustion engine, said diesel internal combustion engine comprising:
        a cylinder head comprising mixture intake valves, exhaust valves and diesel injectors,
        a cylinder block housing a plurality of cylinders; each cylinder comprising a piston,
        said cylinder head being configured to be secured on a top of the cylinder block so as to form a combustion chamber receiving a mixture of air and diesel,
        said diesel intake assembly including air outlets being secured on said cylinder head,
    B. replacing diesel injectors by spark plugs in the cylinder head,
    C. removing of the diesel intake assembly, and
    D. setting of a hydrogen intake assembly on the cylinder head.

2. A method for manufacturing a hydrogen internal combustion engine including a hydrogen intake assembly comprising:
    at least one air intake manifold comprising:
        an air intake pipe comprising at least one air inlet and air outlets,
        air intake runners comprising air inlets and air outlets, said air inlets of the air intake runners being connected to the air outlets of the air intake pipe,
    a spacer having a wall defining an inner chamber receiving a mixture of air, water and hydrogen and comprising air inlets and mixture outlets delivering said mixture, said air inlets of the spacer being connected to the air outlets of the air intake runners, said mixture outlets of the spacer being configured to be secured on a cylinder head of a hydrogen internal combustion engine,
    a water rail comprising at least one water inlet and water outlets, said water outlets being embedded in the wall of the spacer and
    a hydrogen rail comprising at least one hydrogen inlet and hydrogen outlets, said hydrogen outlets being connected to hydrogen intake pipes including hydrogen inlets and hydrogen outlets, said hydrogen outlets of the hydrogen intake pipes being embedded in the wall of the spacer, the method, comprising:
        A. providing the diesel internal combustion engine including a diesel intake assembly and a diesel internal combustion engine, said diesel internal combustion engine comprising:
            a cylinder head comprising mixture intake valves, exhaust valves and diesel injectors,
            a cylinder block housing a plurality of cylinders; each cylinder comprising a piston,
            said cylinder head being configured to be secured on a top of the cylinder block so as to form a combustion chamber receiving a mixture of air and diesel,
            said diesel intake assembly including air outlets being secured on said cylinder head, B. replacing diesel injectors by spark plugs in the cylinder head,
C. removing of the diesel intake assembly, and
D. setting of a hydrogen intake assembly on the cylinder head.

3. The method according to claim 2, wherein each air intake runner includes at least one loop surrounding the air intake pipe.

4. The method according to claim 3, wherein each air intake runner includes at least two loops surrounding the air intake pipe.

5. The method according to claim 2, wherein each intake runner has a length between 500 and 2000 mm.

6. The method according to claim 2, wherein the air inlets of the air intake runners, the air outlets of the air intake runners and/or the outlets of the air intake pipe have an oval shape or a convergent shape.

7. The method according to claim 2, wherein the hydrogen outlets of the hydrogen intake pipes comprise each a hydrogen injector embedded in the wall of the spacer.

8. The method according to claim 7, wherein a longitudinal axis of the inner chamber of the spacer and a longitudinal axis of the hydrogen injector forms an angle between 10 and 40°.

9. The method according to claim 7, wherein the hydrogen injectors and the water injectors are located on a common transversal section of the wall of the spacer.

10. The method according to claim 2, wherein the water outlets comprise each a water injector embedded in the wall of the spacer.

11. The method according to claim 2, wherein the hydrogen intake assembly comprises two air intake manifolds comprises each one air inlet.

* * * * *